Patented Jan. 30, 1934

UNITED STATES PATENT OFFICE 1,945,267

CONTACT SULPHURIC ACID PROCESS

Franz P. Fiedler, Pittsburgh, and Alphons O. Jaeger, Mount Lebanon, Pa., assignors to The Selden Company, Pittsburgh, Pa., a corporation of Delaware No Drawing. Application June 1, 1931
Serial No. 541,488

5 Claims. (Cl. 23—175)

This invention relates to the catalytic oxidation of sulphur dioxide to sulphur trioxide, the contact sulphuric acid process, by means of a new class of catalysts.

According to the invention catalysts are used which contain vanadium or other metal element of the 5th and 6th groups of the periodic system in chemical combination together with thallium in chemical combination, the thallium being present either as an oxide or salt and the vanadium in the form of a metallate, an oxide, or in the form of a vanadyl salt. The presence of thallium compounds in vanadium catalysts for use in the contact sulphuric acid process has been found to exert a decided improvement on the yield both at low and high loadings, and the results obtained are much superior to those produced when vanadium oxides are used alone.

Although efficient catalysts may be obtained by the use of thallium and vanadium compounds alone, we have further found that the addition of compounds of aluminum or silver to the catalyst results in further improvements in the results obtained. The silver or aluminum may be present in chemical combination with the vanadium or in the form of an oxide admixed therewith or, in the case of aluminum, it may be present in the form of a metallate.

In order to increase the activity and effective life of the catalysts of the present invention stabilizers are preferably added, which are compounds of the alkali forming metals. The alkaline earth metals appear to produce a more favorable effect on the catalysts containing thallium and vanadium than do the alkali metal compounds, and compounds of calcium, particularly calcium oxide, appear to be the most desirable. The invention is not limited however to the use of any definite class of stabilizer and in fact satisfactory results may be obtained in some cases when no stabilizer is used at all.

The catalysts of the present invention are preferably supported upon carriers, of which those containing silicon are the most satisfactory. Such carrier materials as kieselguhr, diatomaceous earth, and "Celite" brick fragments are suitable for this purpose, as are the synthetic pellets prepared from silicious material with metallates or metal oxides as a binder. We do not here claim broadly the use of the last two forms of carriers as these form the subject matter of the co-pending applications of Alphons O. Jaeger Serial No. 541,118 filed May 29, 1931 and Serial No. 526,133 filed March 28, 1931.

The catalysts for use in the present invention are prepared by spraying or otherwise coating or impregnating the catalysts upon the carrier material, the various components being applied either simultaneously or successively. The products so obtained are preferably given a pretreatment at elevated temperatures with air, $SO_2$ or $SO_3$ gases or mixtures of these and during this treatment, as well as during the first stages of use, secondary changes occur in the catalyst such as the neutralization of basic components by the acid gases, driving off of volatile components, and the like. It is to be understood that catalysts which have undergone such secondary changes are included within the scope of the invention as well as those which are freshly prepared.

The invention will be further described in connection with the following examples which are for illustrative purposes and to which it is not limited.

Example 1

8 parts by weight of $Tl_2O_3$ are dissolved in aqua regia, diluted to about 200 volumes, and sprayed onto 250 parts by volume of "Silocel C-22" of 6–10 mesh. 16 parts by weight of $NH_4VO_3$ are dissolved in about 250 parts of water and also sprayed onto the carrier, which is preferably heated and agitated in such a manner as to produce a uniform coating.

The catalyst is calcined for 1½ to 2 hours at temperatures of 300–400° C. using air or dilute $SO_2$ gases, after which it is filled into a converter and 7% burner gases passed over it. Yields up to 97–98% are obtained and the catalyst retains its activity over long periods of time.

Example 2

A catalyst containing thallium, silver and vanadium in the ratio $Tl_2O_3:Ag_2O:V_2O_5=\frac{1}{4}:1:1$ is prepared as follows:

8 parts by weight of $Tl_2O_3$ are dissolved in aqua regia and heated with $H_2SO_4$ until the HCl and $HNO_3$ are mostly expelled. The suspension is diluted to 250 parts by weight and boiled to bring the compound into solution. This solution is sprayed upon 250 parts by volume of "Silocel C-3".

A solution of 24 parts by weight of silver nitrate in 50 parts diluted water is poured into 220 parts of water containing 16 parts ammonium vanadate and the precipitate dissolved by the addition of ammonium hydroxide. This solution is then sprayed upon the prepared carrier, which is heated to evaporate the water and produce a uniform coating.

The catalyst, when tested in the usual manner, gives the following results:

| Loadings, liters/hr | 80 | 135 | 150 |
|---|---|---|---|
| % conversion | 97.9 | 96.6 | 95.9 |

*Example 3*

A stabilized catalyst containing thallium and vanadium is prepared in the following manner:

A slurry of 4.5 parts by weight $CaCO_3$ in 100 parts water is neutralized with nitric acid and added to a solution prepared by dissolving 8 parts $Tl_2O_3$ in aqua regia and the solution, made up to 250 parts by volume, is sprayed onto 250 parts by volume of "Silocel C-22" or other suitable carrier material. A second coating consisting of 16 parts $NH_4VO_3$, suitably dissolved in water, is then applied and the catalyst calcined as in previous examples. With this catalyst, under the usual conditions, yields of 98% and better can be obtained.

The term "metallate" is used in the specification to cover salts of metal acids such as, for example, potassium aluminate, potassium vanadate, etc., as opposed to salts of the acids of the non-metals.

What is claimed as new is:

1. A process of oxidizing sulphur dioxide to sulphur trioxide, which comprises bringing about reaction between sulphur dioxide and oxygen containing gases in the presence of a catalyst containing thallium oxide and vanadium in chemical combination.

2. A process of oxidizing sulphur dioxide to sulphur trioxide, which comprises bringing about reaction between sulphur dioxide and oxygen containing gases in the presence of a catalyst containing thallium oxide and vanadium oxide.

3. A process of oxidizing sulphur dioxide to sulphur trioxide, which comprises bringing about reaction between sulphur dioxide and oxygen containing gases in the presence of a catalyst containing a carrier with which is associated an oxide of thallium and an oxide of vanadium.

4. A process of oxidizing sulphur dioxide to sulphur trioxide, which comprises bringing about reaction between sulphur dioxide and oxygen containing gases in the presence of a catalyst containing diatomite brick fragments with which is associated an oxide of thallium and an oxide of vanadium.

5. A process of oxidizing sulphur dioxide to sulphur trioxide, which comprises bringing about reaction between sulphur dioxide and oxygen-containing gases in the presence of a catalyst containing a carrier with which is associated thallium oxide, silver oxide and vanadium pentoxide in proportions not materially different from the ratio $\frac{1}{4}:1:1$ respectively.

FRANZ P. FIEDLER.
ALPHONS O. JAEGER.